United States Patent [19]

Auriol et al.

[11] Patent Number: 5,651,172

[45] Date of Patent: Jul. 29, 1997

[54] PROCESS FOR THE ASSEMBLY OF MATERIALS AND RIVETING MEMBER FOR CARRYING OUT THE PROCESS

[75] Inventors: Jean-Marc Auriol; Philippe Bornes, both of Flourens, France

[73] Assignee: Ste. Ateliers de la Haute-Garonne-Ets Auriol et Cie, Balma, France

[21] Appl. No.: 220,400

[22] Filed: Mar. 30, 1994

Related U.S. Application Data

[63] Continuation of Ser. No. 916,102, filed as PCT/FR91/00037, Jan. 21, 1991, abandoned.

[30] Foreign Application Priority Data

Jan. 26, 1990 [FR] France ............... 90 01372

[51] Int. Cl.⁶ ................ B21D 39/00; B23P 11/00
[52] U.S. Cl. ............ 29/512; 29/524.1; 29/525.06
[58] Field of Search ................. 29/522.1, 512, 29/524.1, 525.06, 525.07; 411/501, 504, 505, 506, 507, 15, 21, 22, 24, 34, 44, 70, 71

[56] References Cited

U.S. PATENT DOCUMENTS

| 206,801 | 8/1878 | Leddy | 411/505 |
|---|---|---|---|
| 1,587,445 | 6/1926 | Thomson | 29/525.2 X |
| 2,501,567 | 3/1950 | Huck | 411/501 X |
| 2,751,809 | 6/1956 | Barker | 411/15 |
| 3,042,961 | 7/1962 | Tieri | 29/522.1 X |
| 3,047,181 | 7/1962 | Heidenwolf | 29/512 |
| 3,130,629 | 4/1964 | Church | 29/525.2 X |
| 3,383,784 | 5/1968 | Bien | 29/522.1 X |
| 3,467,996 | 9/1969 | Voice | 411/501 X |
| 4,046,053 | 9/1977 | Alvi et al. | 85/72 |
| 4,221,041 | 9/1980 | Hufnagl et al. | 29/512 |

FOREIGN PATENT DOCUMENTS

| 0216405 | 4/1987 | European Pat. Off. . | |
| 2306361 | 3/1976 | France . | |
| 826586 | 1/1952 | Germany | 411/504 |
| 6925101 | 12/1969 | Germany . | |
| 9111625 | 8/1991 | WIPO . | |

Primary Examiner—Joseph M. Gorski
Attorney, Agent, or Firm—Harold H. Dutton, Jr.; Diane F. Liebman

[57] ABSTRACT

The invention relates to a process for assembling materials by means of a riveting member of the type comprising a mandrel (2) and a sleeve (1). The sleeve (1) is provided with a peripheral recess on its external surface, in particular a groove (5), for forming a bending zone, while the mandrel has a head (9) able to deform the tubular end of the sleeve and to fold it back at the level of its bending zone. During riveting, the peripheral recess of the sleeve preserves the starting point of the countersink of the material against any stress and the bending zone of the sleeve permits providing a bearing surface of great dimension applied precisely against the materials.

8 Claims, 4 Drawing Sheets

PROCESS FOR THE ASSEMBLY OF MATERIALS AND RIVETING MEMBER FOR CARRYING OUT THE PROCESS

This application is a continuation of U.S. Application Ser. No. 07/916,102, filed as PCT/FR91/00037 on Jan. 21, 1991, and now abandoned.

This invention relates to a process for the assembly of materials, applicable both for assembling hard materials, notably light alloys, and for brittle or fragile materials, particularly laminated synthetic materials reinforced by fibers (often designated "composite materials"). The invention extends to a riveting member serving to enable carrying out the process.

BACKGROUND AND OBJECTS OF THE INVENTION

Riveting members are known which are essentially comprised of two pieces: a mandrel having a shank and a head, and a tubular sleeve intended to receive the shank of the mandrel and to be deformed by its head in order to constitute a post-formed fastening head on one side of the materials. For example, reference is had to French patent 2,306,361 which describes a riveting member of this type. However, known members of this type are not suited to brittle or fragile materials: in effect, during riveting, the sleeve undergoes at its end a sizeable radial expansion (for creating the post-formed head), susceptible of seriously damaging this type of materials in the area situated beneath said post-formed head, with risks of delamination and unbonding of the fibers. In addition, regardless of the materials assembled, the fastening range created by the post-formed head has a generally longitudinal direction and is of reduced dimensions such that the fastening hold is mediocre.

In addition, the document EP-A-0.216.405 describes in reference to its FIGS. 7 to 10, a blind riveting process, that is a process of riveting in which the access is available from only one side of the materials to be riveted, and which is achieved by a rupturing of the mandrel due to an appropriate tensile force exerted thereon. This process avoids damaging the materials at the level of the postformed head but it is subject to the drawbacks of blind processes (in particular to those related to the need to break the shank of the mandrel at the completion of the riveting), and leads to an assembly with reduced strength. Moreover, this process does not permit in any case introducing radial compressire forces between the sleeve and the materials to be riveted without damaging the latter. In many applications, these compressive forces are desired for increasing the fatigue strength of the assembly.

The present invention seeks to provide a new riveting process which can be used for all materials without risk of damage in the case of fragile materials, and which leads to an excellent fastening behavior (shear, tensile, fatigue strength).

Another object of the invention is to permit production of a countersunk/countersunk assembly, with a good flattening, without having to carry out a separate flattening step on the riveting member.

DESCRIPTION OF THE INVENTION

To this end, the assembly process provided by the invention uses a riveting member of the type comprising, on one hand, a mandrel having a shank and a head, and on the other hand, a tubular sleeve adapted to receive the shank of the mandrel and having a tubular end able to be deformed by the head of the mandrel in order to constitute a post-formed head on one side of the materials to be assembled. In accordance with the present invention, said process comprises:

providing in the materials to be assembled, a bore having a countersink on at least one side of said materials, using a sleeve, the tubular end of which is provided on its external surface with a peripheral recess forming a bending zone extending toward the free end of the sleeve through a fastening zone, said peripheral recess being positioned along the sleeve in such a manner as to be clear of the start of the countersink of the bore when the sleeve is set in the bore, using a mandrel, the head of which is provided with an underface of a diameter decreasing in the direction of the shank, able to deform the tubular end of the sleeve and to the same back at the level of its bending zone, introducing the sleeve into the bore such that its tubular end provided with the peripheral recess is situated at the side of the countersink, the bending zone extending from one end to the other of said countersink, said sleeve being introduced. solely into the bore in the absence of the mandrel, maintaining the sleeve in the bore by means of a hollow piston arranged in supporting relationship against said sleeve from the side opposite to the aforementioned countersink, then providing the mandrel from the side of the materials at which is located the countersink, opposite the tubular end of the sleeve having the peripheral recess, introducing and forcing the mandrel into the sleeve through the tubular end thereof having the peripheral recess, exerting, by means of an anvil, a pressure against the head of the mandrel in such a manner as to cause the head of the mandrel to deform the tubular end of the sleeve, the underface of said head assuring a outward deformation of the end of the sleeve causing at least one part of the bearing surface thereof to contact the material at the interior of the countersink, setting the mandrel in the sleeve.

Thus, during riveting, the peripheral recess protects the origin of the countersink against all stresses and the fastening head is formed by folding the shank at the level of the bending zone of the shank (and not by expansion as is the case in the member described in French patent 2,306,361). This avoids damaging the materials beneath the postformed head and permits providing a bearing surface of large dimension, precisely applied against the materials. The aforementioned recess is preferably formed by a peripheral groove arranged around the sleeve. It may also be constituted by a shoulder.

The length of the sleeve may be adapted so that, after deformation, the free end thereof becomes essentially flush with the outer edge of the countersink of the hole. A good leveling of the postformed head is thus obtained without having to carry out a flattening step (this operation being very risky because of the weakening of the assembly which it can cause).

The process of the invention is applied in particular for obtaining a countersink/countersink assembly. Thus, a sleeve having a preformed head is used, which comes to rest, during riveting, in a corresponding countersink which is formed in the materials (opposite to the countersink intended to receive the postformed head). It is possible to obtain, without leveling, a good flattening of the side of the preformed head by providing a mandrel which extends beyond the preformed head, and causing the extending part during setting to become flush and to be expanded in the hollow bore of the preformed head, which may be provided for this purpose with a small countersink.

Furthermore, for increasing the fatigue strength of the assembly, the process of the invention may be carried out by using a mandrel, the shank of which has an external diameter greater than the inside diameter of the sleeve in order to cause an expansion of the sleeve upon introduction of the mandrel and a radial pressure between the sleeve and the materials to be assembled. Such an expansion introduces between the sleeve and the materials radial compressive forces which considerably improve the fatigue strength of the assembly. Moreover, in the case of conductive materials, such an expansion also improves the electrical continuity. It should be noted that the sleeve used preferably has a outside diameter essentially corresponding to the inside diameter of the bore. The expansion is thus achieved only during introduction of the mandrel without risk of abrasion or tearing at the sleeve/material interface. In the case of a light alloy material, the mandrel is advantageously provided so as to cause an expansion of a value comprising between about 0.1 and 0.4 mm. In the case of composite materials, the amount of expansion will be greatly reduced and limited to between about 0.05 mm and 0.2 mm in order to avoid risks of delamination.

The invention extends to a riveting member permitting carrying out the above described process. This member comprises, for one part, a mandrel having a shank and a head, and for the other part, a sleeve adapted to contain the shank of the mandrel and having a tubular end able to be deformed by the head of the mandrel, the sleeve having a tubular end provided on its external surface with a peripheral recess forming a deformation or bending zone extending toward the free end through a fastening zone, the mandrel having a head provided with an underface of a diameter decreasing in the direction of the shank, able to deform the tubular end of the shank and to fold it back at the level of its deformation zone, the outside diameter of the mandrel being adjusted in such a manner as to exceed the internal diameter of the sleeve by a value comprising between 0.05 mm and 0.3 mm.

DESCRIPTION OF THE DRAWINGS

The invention having been described in its general form, other characteristics, objects and advantages will become apparent from the description which follows in reference to the accompanying drawings which show, by way of non-limiting example, an embodiment of the riveting member according to the invention and an embodiment of the assembly process. In these drawings, which form an integral part of the present description.

DETAILED DESCRIPTION OF PREFERRED EMBODIMENTS

Figure 1:
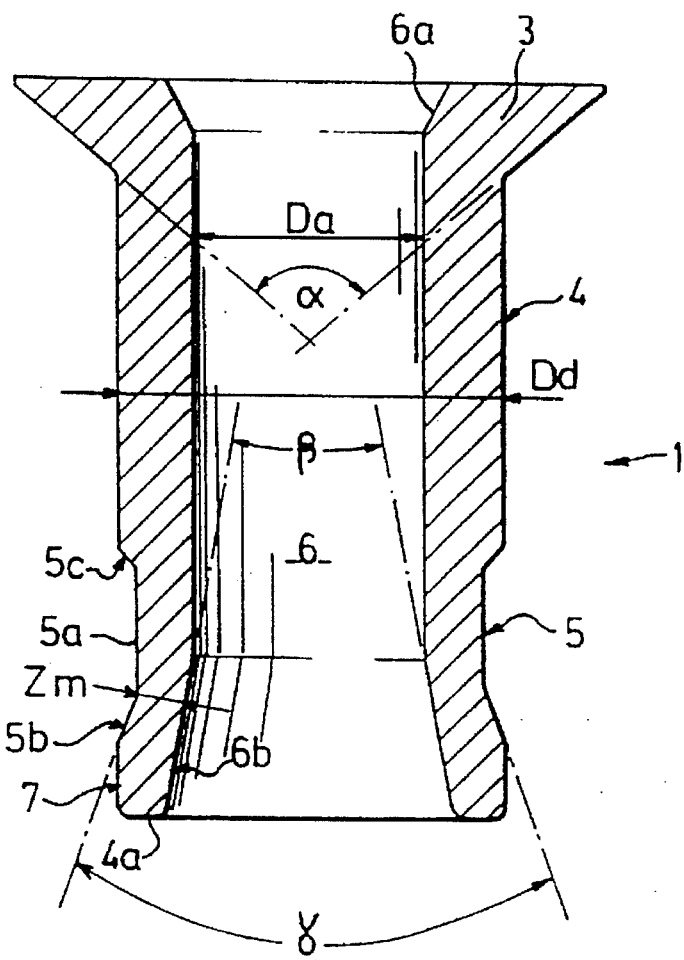
FIGS. 1 and 2 are axial cross-sectional views on an enlarged scale, respectively of the sleeve and a mandrel constituting the riveting member.
Figure 2:
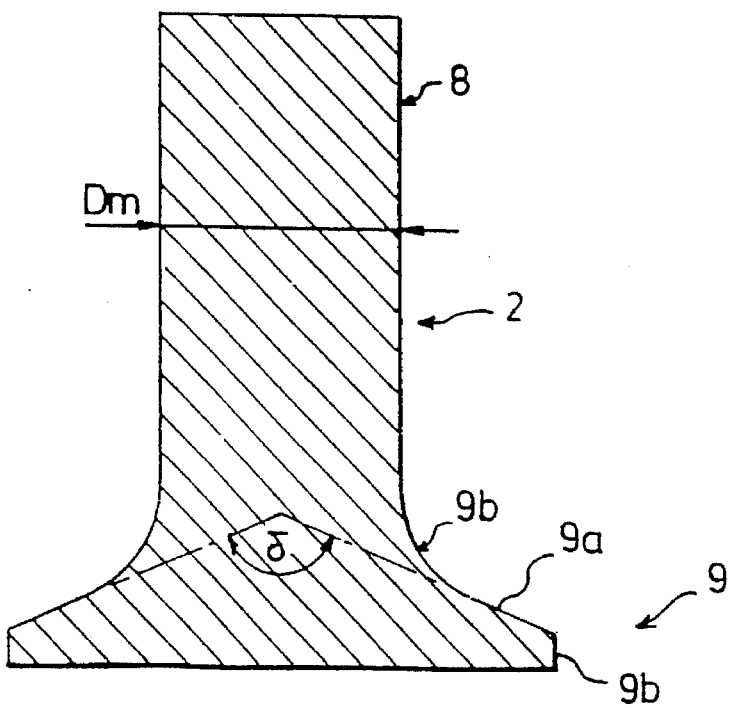

The riveting member shown by way of example in FIGS. 1 and 2 is comprised of a sleeve 1 which may be made of titanium (T40) in order to benefit from the deformability characteristics of this material, and a mandrel 2 (FIG. 2) which may be made of stainless steel (austenitic steel) in order to benefit from good mechanical characteristics. Moreover, these materials are perfectly compatible with most assembly materials (light alloys, composite materials...).

The sleeve 1 comprises, for one part, a preformed, countersink head 3 having a frustoconical shape, with a cone angle $\alpha$ on the order of 100°, and for another part, a tubular cylindrical shank 4 of an external diameter Dd of which the end opposite to the head 3 is provided with a peripheral recess comprised by a groove 5. The hollow core 6 of the sleeve has a bore which is of a cylindrical shape over most of its length (diameter Da), with a small countersink 6a at the level of the head 3 and a portion 6b of a frustoconical shape at the opposite tubular end. The cone angle $\beta$ of this portion is, in the example, on the order of 15°. This portion extends up to the level of the groove 5 in such a manner as to define a zone of lesser thickness Zm in proximity to the starting point of the groove, the thickness of the sleeve then increasing progressively from this zone to the center of the groove; thus there is provided a progressive bending zone of the sleeve extending from the zone Zm toward the center of the groove.

In the preferred embodiment shown, the bottom 5a of the groove is cylindrical, with a cylindrical axis coincident with the axis of the sleeve, and its edges 5b and 5c are frustoconical, the edge 5b having a smaller cone angle $\epsilon$ (on the order of 40°) and joining up with a cylindrical surface 7 situated at the end of the sleeve. This conical edge 5b and its cylindrical extension 7 form a fastening surface which comes either in part or entirely into contact with the materials to be assembled during riveting. The cylindrical fastening surface 7 and the frustoconical portion 6b meet at the extreme edge 4a of the sleeve by rounded parts.

Further, the mandrel 2 which is caused to penetrate into the sleeve 1 during riveting, comprises a solid cylindrical shank 8 of a diameter Dm and a head 9 having an underface 9a and a short cylindrical rim 9b.

The diameter Dm of the shank 8 is greater than the bore Da of the sleeve 1 in order to cause an expansion thereof during riveting. The difference of these diameters is a function of the application and will comprise between 0.1 mm and 0.4 mm for the assembly of materials of light aluminum alloy, and between 0.05 mm and 0.2 mm for the assembly of composite materials.

The under-face 9a has a frusto-conical shape, with a cone angle $\epsilon$ in the example, on the order of 135°. It joins up with the shank through a rounded portion 9b which assures a progressive folding of the tubular extremity of the sleeve during riveting.

The length of the shank of the mandrel is adjusted such that the shank extends beyond the beginning of the countersink 6a of the sleeve after introduction, this length of extension being sufficiently slight in order that the material can come by 'flowing' to be seated in this countersink 6a of the sleeve during setting of the rivet. In the example, a length of extension on the order of 0.5 to 1.0 mm gives good results and permits obtaining a good levelling of the side of the preformed head.

FIGS. 3 through 8 show the material assembly process by means of the riveting member described hereinabove.

Figure 3:
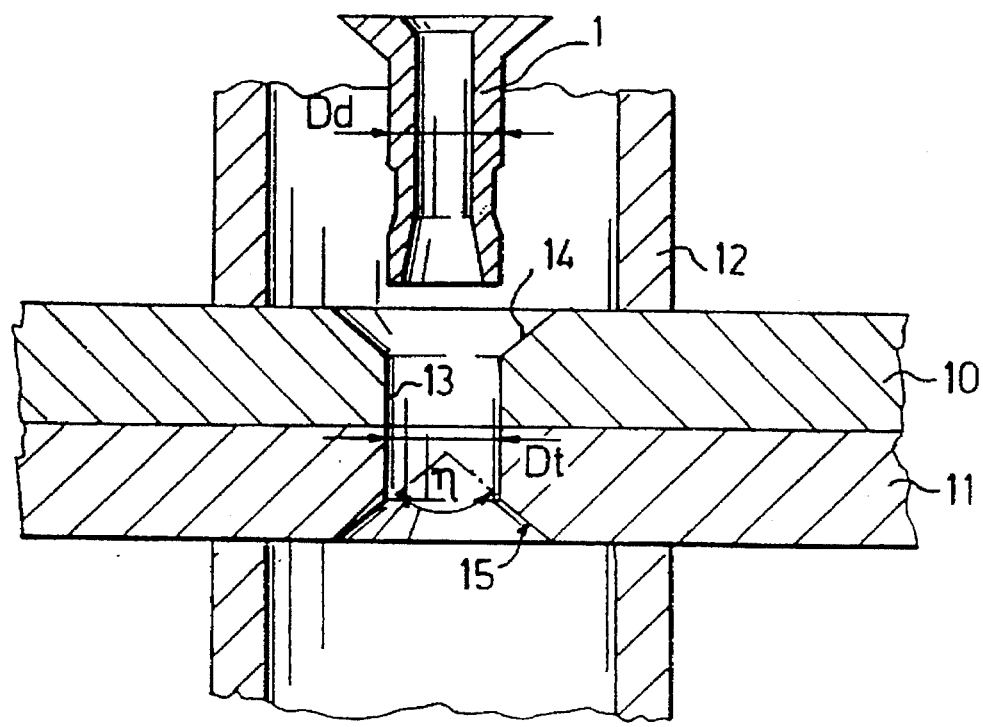
FIGS. 3 to 8 illustrate in cross-section the assembly process of the materials by means of said member.

These materials may in the example be comprised of sheets 10 and 11 of laminated synthetic materials reinforced by fibers (FIG. 3). These sheets are held in a conventional manner by clamp members 12, and are provided with a cylindrical hole 13 having tapering on each side in order to provide two identical countersinks 14 and 15, the cone angle η of which in the example is on the order of 100°. The bore of the hole Dt corresponds to the external diameter Dd of the sleeve 1 (with play of less than 0.05 mm).

A sleeve 1 is used with a length greater than the thickness of the materials to be assembled, adjusted so that the tubular end of the sleeve extends beyond the materials by a length on the order of 0.5 to 1.25 mm so that the free end of the sleeve comes essentially flush with the outer edge of the countersink 15 after bending.

Figure 4:
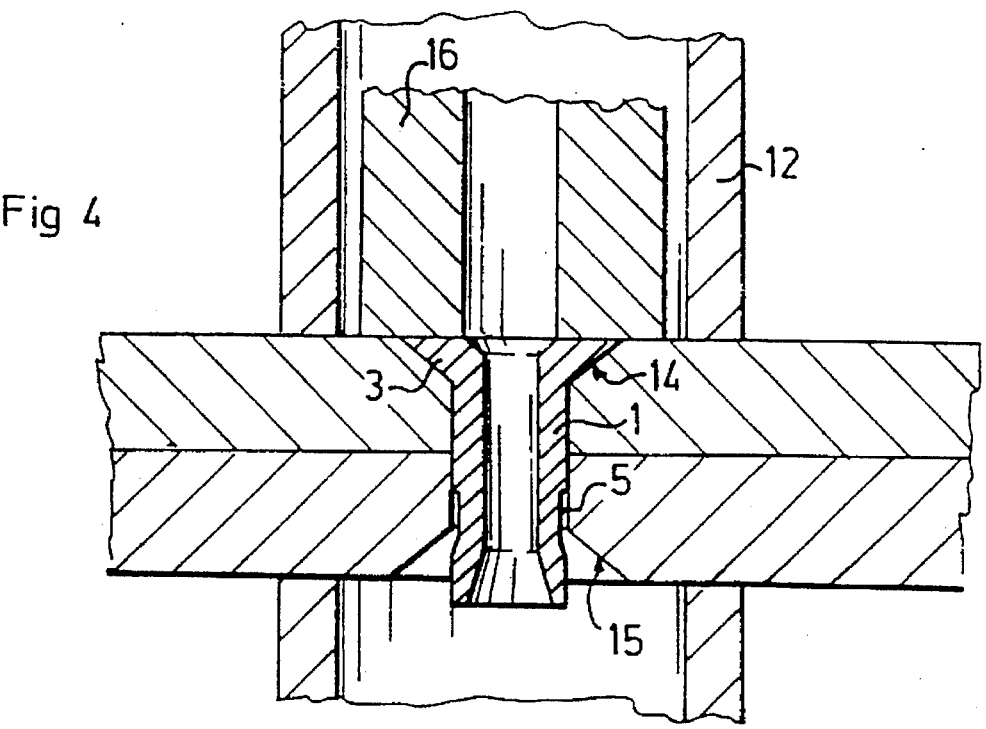

The sleeve 1 is introduced into the hole in the materials until it is housed with its preformed head 3 in the corresponding countersink 14 of the hole (FIG. 4). The peripheral recess 5 of the sleeve has been provided on the sleeve in such a manner as to extend, in this position, from one end to the other of the countersink 15.

The sleeve 1 is maintained in this position by means of a hollow piston 16 which is brought to rest against the frontal face of the preformed head 3, as shown in FIG. 4.

Figure 5:
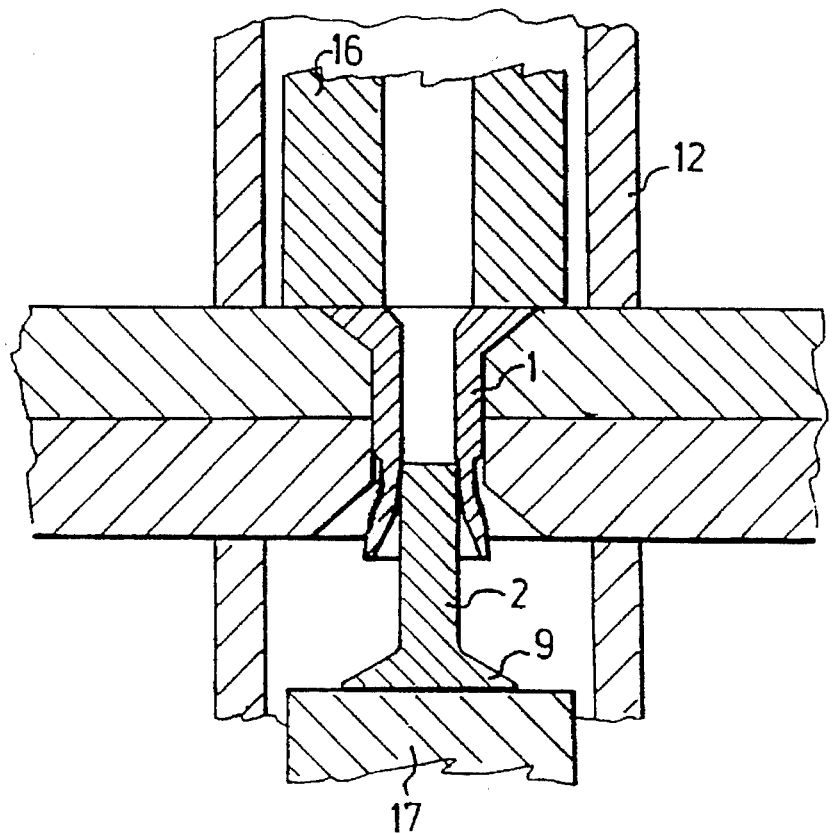

The mandrel is then provided from the side opposite to the preformed head of the sleeve and is introduced into the sleeve (FIG. 5). In the case of composite materials, the mandrel is selected so as to have a shank determining a slight expansion of the sleeve (between 0.05 and 0.2 mm).

Figure 6:
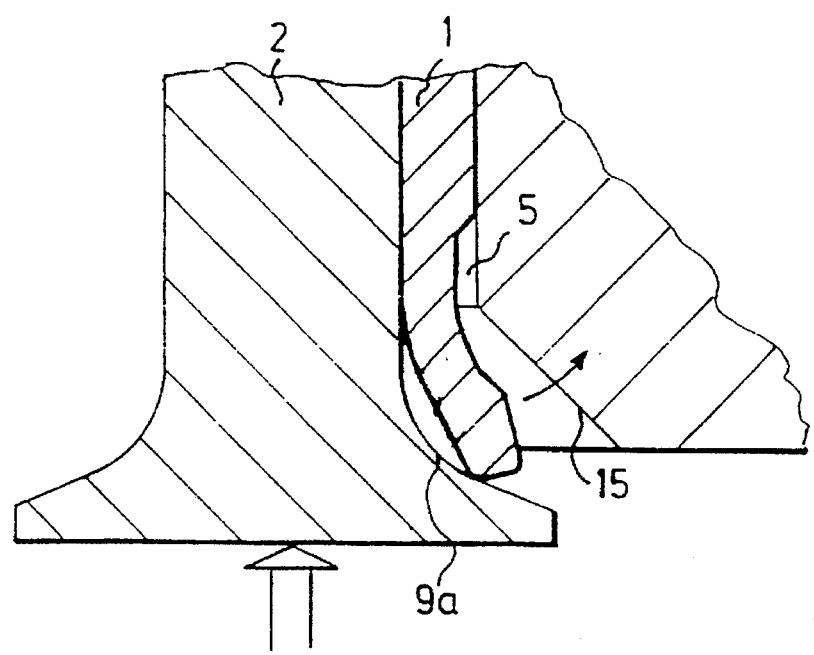

The mandrel is forced into the sleeve by means of an anvil 17 (solid piston). This penetration assures the expansion of the sleeve and the appearance of compressive stresses at the interface between the sleeve and the composite materials. It should be noted that these stresses are purely radial and do not cause any damage of the composite materials because of their precise expansion values. After complete penetration, the head of the mandrel comes into contact with the sleeve and produces a deformation of its tubular end: the under-face 9a of the head assures a radially outward folding back of this end, a folding back which starts in the area of least thickness defined by the peripheral recess 5 and extends progressively therealong. FIG. 6 illustrates this progressive folding back of the sleeve. It should be noted that the composite materials are not stressed by this folding, in particular at the level of the countersink 15 and its beginning which remain out of contact with the sleeve.

Figure 7:
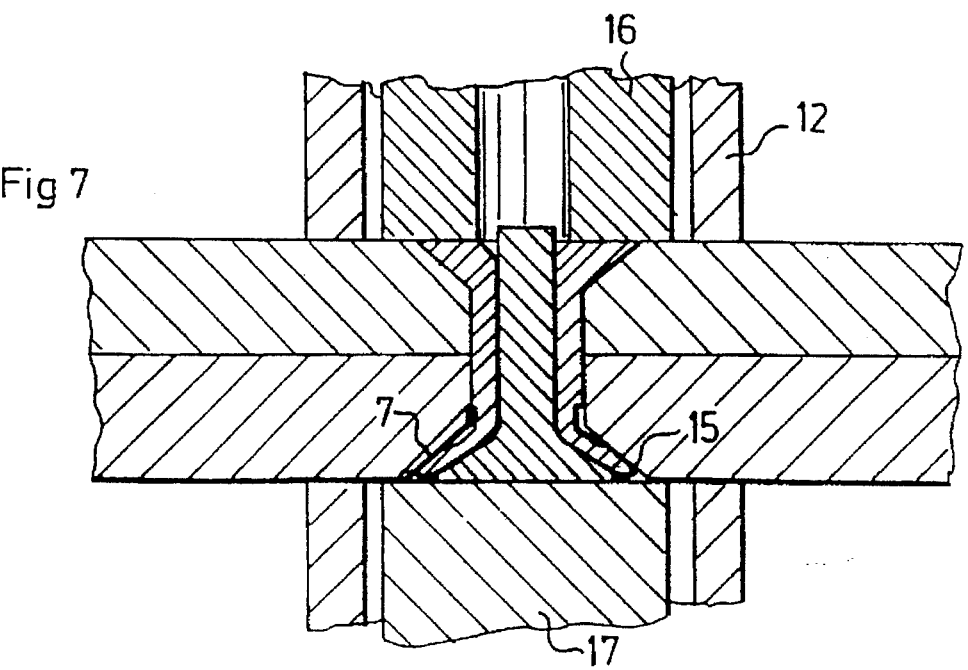

The mandrel is forced into the sleeve until the fastening surface thereof contacts the materials to be assembled on the interior of the countersink 15 (FIG. 7). In the case of composite materials, the folding back is produced in such a manner as to produce a moderate pressure between the sleeve and the materials in order not to damage the materials. In this case, only the cylindrical fastening surface 7 comes into contact with the materials. In the case of metal materials, especially light alloys, this pressure may be higher, a portion or all of the frustoconical surface 5b (the edge of the recess 5) coming thusly to rest against the materials being assembled.

Figure 8:
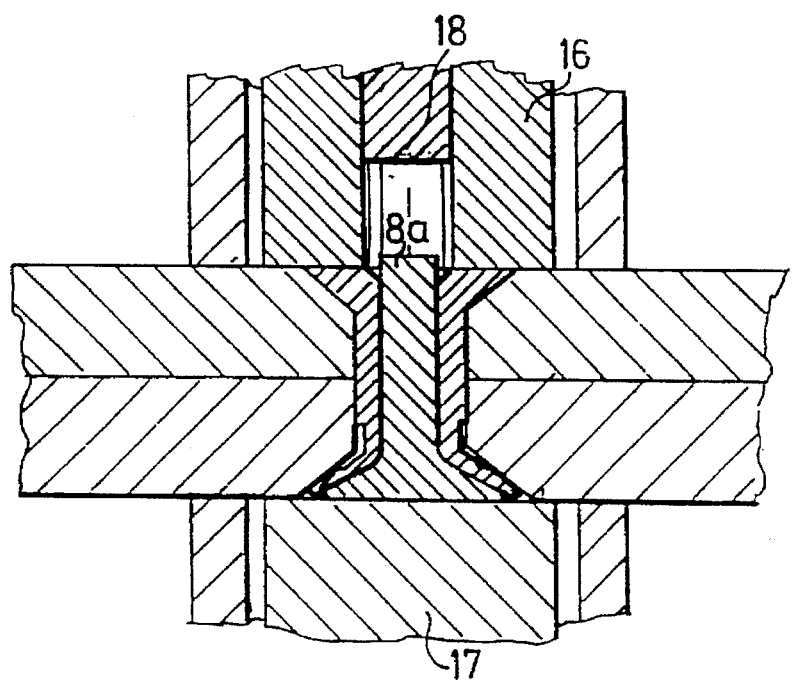

The mandrel is then set in the sleeve by means of a die 18 which flattens the extending portion of the shank of the mandrel and produces a cold flow of the material thereof toward the small countersink 6a of the sleeve (FIG. 8).

Figure 9:
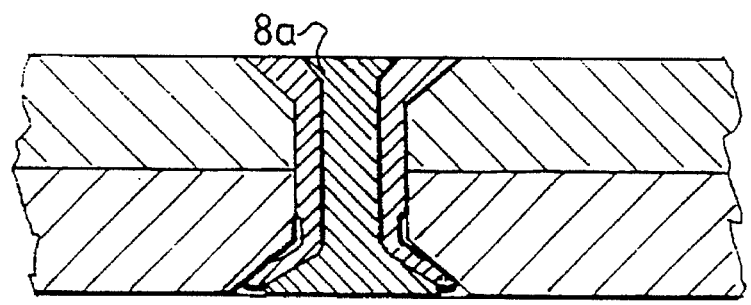
FIG. 9 is a cross-section of the assembly obtained.

The process of the invention leads to an assembly such as shown schematically in FIG. 9, benefitting from a good flattening of the two sides without any need for carrying out flattening operations. This assembly benefits from excellent mechanical properties by reason of the presence of a stainless steel mandrel under compression on the interior of the sleeve (shear strength greater than 30 to 60% with respect to that of solid, light alloy rivets, tensile strength and installed strength greater by about 10 to 15%, excellent fatigue strength). Micrographic tests of cross-sections of the assembly have confirmed that the sheets of the composite materials are not damaged by the riveting.

We claim:

1. A process for assembling two members together, comprising the steps of:

providing first and second abutting members having aligned bores of equal diameter, with said first members having a countersink communicating with its bore;

providing a sleeve having a head of a diameter greater than the diameter of said bores, a first cylindrical portion extending from said head and having an outer diameter corresponding substantially to the diameter of said bores, a second cylindrical portion extending from said first cylindrical portion and having an outer diameter less than that said first cylindrical portion, and a third cylindrical portion extending from said second cylindrical portion and located at a second end of said sleeve and having an outer diameter substantially equal to that of said first cylindrical portion, said sleeve also having a first inner surface of a substantially constant diameter, and a second inner surface extending from said first inner surface to said second end and tapering in diameter from said second end to said first inner surface;

providing a mandrel having a head at one end thereof and a cylindrical shank extending from said head, with said head decreasing in diameter from said one end toward said cylindrical shank, and with said cylindrical shank being of a diameter greater than that of said first inner surface and less than that of at least a part of said second inner surface;

introducing said sleeve without said mandrel into said bores from a side of said members opposite said countersink, such that said first cylindrical portion is positioned entirely within said bores, said second cylindrical portion is positioned partly within the bore of said one member and partly within said countersink, said third cylindrical portion is positioned partly within said countersink and partly extending therefrom, and said head of said sleeve rests against said second member;

providing a piston having a bore extending therethrough, and maintaining said sleeve in said bores by forcing said piston against said head with the piston bore and sleeve bore in alignment with one another;

inserting said mandrel into said sleeve from said third cylindrical portion and then forcing said shank through said sleeve by forcing an anvil against said head of said shank until an end of said shank extends from said head of said sleeve and into said bore of said piston, whereby said shank expands radially that portion of said sleeve defining said first inner surface such that radial stresses are generated between said sleeve and said members, and said head of said mandrel flares said third cylindrical portion and part of said second cylindrical portion outwardly, such that said third cylindrical portion engages a surface defining said countersink, and said second cylindrical portion defines a circumferential space between part of said surface defining said countersink and part of a surface defining the bore in said one member; and setting said mandrel in said sleeve by outwardly deforming said end of said shank into engagement with said head of said sleeve.

2. The process of claim 1, wherein the head of the mandrel includes an underface of frustoconical shape and is connected to said shank through a rounded portion, with said underface having a cone angle greater than that of said countersink.

3. The process of claim 2, wherein said second inner surface is frustoconical in shape.

4. The process of claim 3, wherein said countersink has a cone angle of about 100°, said second inner surface has a cone angle of about 15°, and the head of the mandrel includes an underface having a cone angle of about 135°.

5. The process of claim 1, wherein said second cylindrical portion is joined to said third cylindrical portion by an intermediate portion tapering from said third cylindrical portion to said second cylindrical portion.

6. The process of claim 1, including stopping said forcing step when an outer surface of said mandrel becomes essentially flush with an outer surface of said first member.

7. The process of claim 1, wherein the second member has a countersink communicating with its bore, the head of the sleeve has a shape corresponding to that of this countersink, and said introducing step includes receiving the head of the sleeve within this countersink.

8. The process of claim 7, wherein the head of the sleeve has a countersink, and setting the mandrel in the sleeve includes forcing a punch through the bore of the piston and against the end of the shank, thereby causing said end to flow outwardly into the countersink of the head.

* * * * *